United States Patent [19]

Graber

[11] 4,065,527
[45] Dec. 27, 1977

[54] METHOD AND APPARATUS FOR INTERACTION OF GAS AND LIQUID

[76] Inventor: David A. Graber, 315 Haight St., Menlo Park, Calif. 94025

[21] Appl. No.: 659,292

[22] Filed: Feb. 19, 1976

[51] Int. Cl.² .............................................. B05B 7/10
[52] U.S. Cl. ..................................... 261/79 A; 55/89; 55/92; 55/222; 55/223; 55/238; 55/257 C; 55/257 HE; 55/261; 55/455; 261/120; 261/151; 261/DIG. 27; 23/284
[58] Field of Search ................. 55/86, 89, 92, 95, 222, 55/223, 235, 236, 237, 238, 249, 257 C, 257 HE, 261, 267, 269, 452, 455, 459 R, 459 C; 261/79 A, 120, 151, DIG. 27; 23/284

[56] References Cited

U.S. PATENT DOCUMENTS

| | | | |
|---|---|---|---|
| 2,075,344 | 3/1937 | Hawley | 261/79 A |
| 2,187,573 | 1/1940 | McCornack | 55/237 |
| 2,976,949 | 3/1961 | Murphy et al. | 55/223 |
| 3,018,231 | 1/1962 | Valentine et al. | 55/222 |
| 3,031,825 | 5/1962 | Delafourniere | 55/236 |
| 3,532,595 | 10/1970 | Arnesjo et al. | 55/223 |
| 3,566,582 | 3/1971 | Yankura | 55/92 |
| 3,572,658 | 3/1971 | Ravitts | 261/120 |
| 3,710,554 | 1/1973 | Brookman | 55/238 |
| 3,854,909 | 12/1974 | Hoisington et al. | 55/257 HE |
| 3,880,597 | 4/1975 | Goldschmidt et al. | 55/262 |
| 3,881,895 | 5/1975 | Wattles | 55/92 |
| 3,907,526 | 9/1975 | Saleem et al. | 55/223 |
| 3,960,992 | 6/1976 | Cyrenne | 55/222 |

FOREIGN PATENT DOCUMENTS 338,108  11/1930  United Kingdom .................... 23/284

Primary Examiner—Frank W. Lutter
Assistant Examiner—David L. Lacey
Attorney, Agent, or Firm—Townsend and Townsend

[57] ABSTRACT

Apparatus and a method for handling a gas and a liquid in a manner to cause a specific interaction between them. The gas is placed into circulation to cause it to make a liquid circulate in a vortex fashion to present a liquid curtain. The gas is then passed through the liquid curtain by angled vanes to cause the interaction between the two fluids, such as the heating of the liquid, scrubbing of the gas, adding a chemical to the liquid and the like. The vanes are spaced apart and project inwardly from the inner periphery of an annular support so that the circulating liquid readily moves into the spaces between the vanes to create the liquid curtain. A number of embodiments of the invention are disclosed.

22 Claims, 8 Drawing Figures

METHOD AND APPARATUS FOR INTERACTION OF GAS AND LIQUID

This invention relates to improvements in the handling of gases and liquids and, more particularly, to apparatus and a method for directing a gas and a liquid along specific paths of travel to cause them to interact in a manner to produce a certain result, such as scrubbing, heating, cooling, and the like.

BACKGROUND OF THE INVENTION

Many industrial applications involving the flow of liquids and gases require, for instance, that these fluids be treated in some manner such as by scrubbing, heating, cooling, mixing and so on. For the most part, the equipment required to treat liquids and gases are specialized in construction and cannot basically be used for other applications. Moreover, such equipment is usually complex in construction and has many moving parts requiring periodic maintenance to keep the equipment in good working order.

In view of these shortcomings, a need has arisen for an improved apparatus and method for creating an interaction between a gas and a liquid so that either one or both of the same can be treated to meet specific requirements, such as minimizing atomspheric pollutants, and cooling, heating and drying air and the like.

SUMMARY OF THE INVENTION

The present invention satisifes the aforesaid need by providing apparatus and a method for utilizing a circulatory flow of a gas to shape a mass of water to form a water curtain through which the gas is to pass, all of which is accomplished without the need for moving parts. Thus, the gas flows through the water curtain and can provide an interaction between the gas and the liquid in a simple manner yet there will be intimate contact between the gas and liquid to permit the treatment of one or both of these fluids.

The aforesaid aims are achieved by providing a housing having fixed, spaced vanes arranged at acute angles relative to each other and in a circular pattern within a circular path of travel of a gas whereby the gas flowing along the circular path will eventually enter and pass through the spaces between the vanes and create a vortex action in the central space surrounded by the vanes to cause a liquid in the central space to circulate in a vortex fashion near the vanes by centrifugal force. The circulating liquid penetrates the spaces between the vanes and remains therein by the centrifugal force exerted thereon. When the gas flows through the liquid curtain, there is a positive interaction between the gas and the liquid.

The present invention is suitable for a wide variety of applications and can be adapted to use as the following: exhaust scrubber, aerator, apparatus for the flotation of grease, chemical reactor, condenser, steam or hot water flash generator, chlorinator, heat exchanger and cooling tower. All of the foregoing utilize the basic concept of the fixed vanes spaced apart and angled so that they surround a central space. Each vane is at an acute angle relative to adjacent vanes so that the gas flow passages between the vanes will extend in the general direction of movement of the gas as it circulates in the path surrounding the vanes.

The primary object of this invention is to provide apparatus and a method for creating an interaction between a liquid and a gas, wherein the gas, because of its flow pattern creates a curtain of the liquid through which the gas must pass to thereby cause intimate contact between the liquid and the gas so that either or both the liquid and gas can be treated in a special manner.

Another object of this invention is to provide apparatus and a method of the type described wherein the gas is caused to pass through the spaces between a plurality of spaced, angled, vanes arranged in a circular pattern about a central space in which liquid can be received and can move so that, as the gas circulates about the vanes and enters and passes through the spaces therebetween, the liquid is caused to move in a vortex fashion adjacent to the vanes and into the spaces therebetween to create a liquid curtain through which the gas must pass to thereby provide for the interaction between the gas and the liquid, all of which is accomplished without moving parts.

Other objects of this invention will become apparent as the following specification progresses, reference being had to the accompanying drawings for illustrations of several embodiments of the invention.

Figure 1:
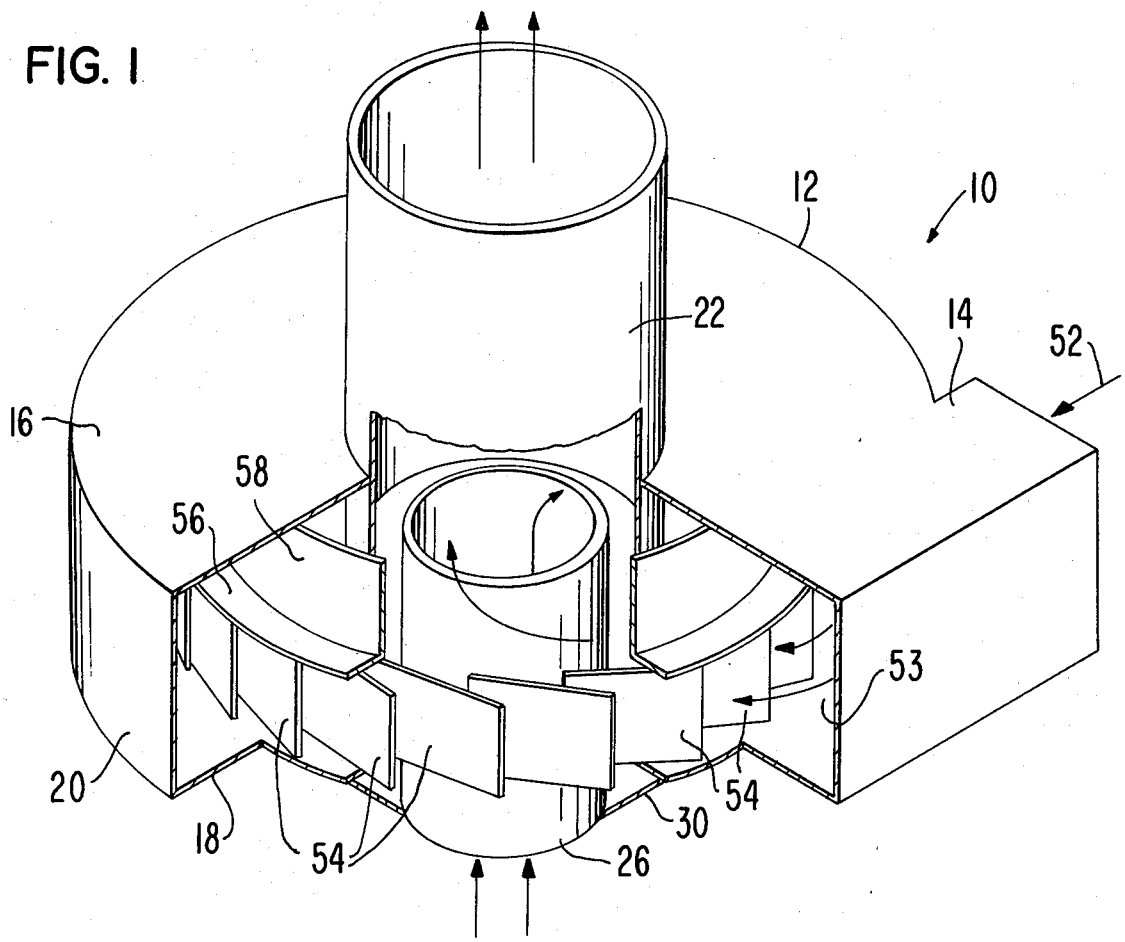
FIG. 1 is a perspective view, partly broken away and in section, of a first embodiment of the invention for use as an air scrubber.
Figure 2:
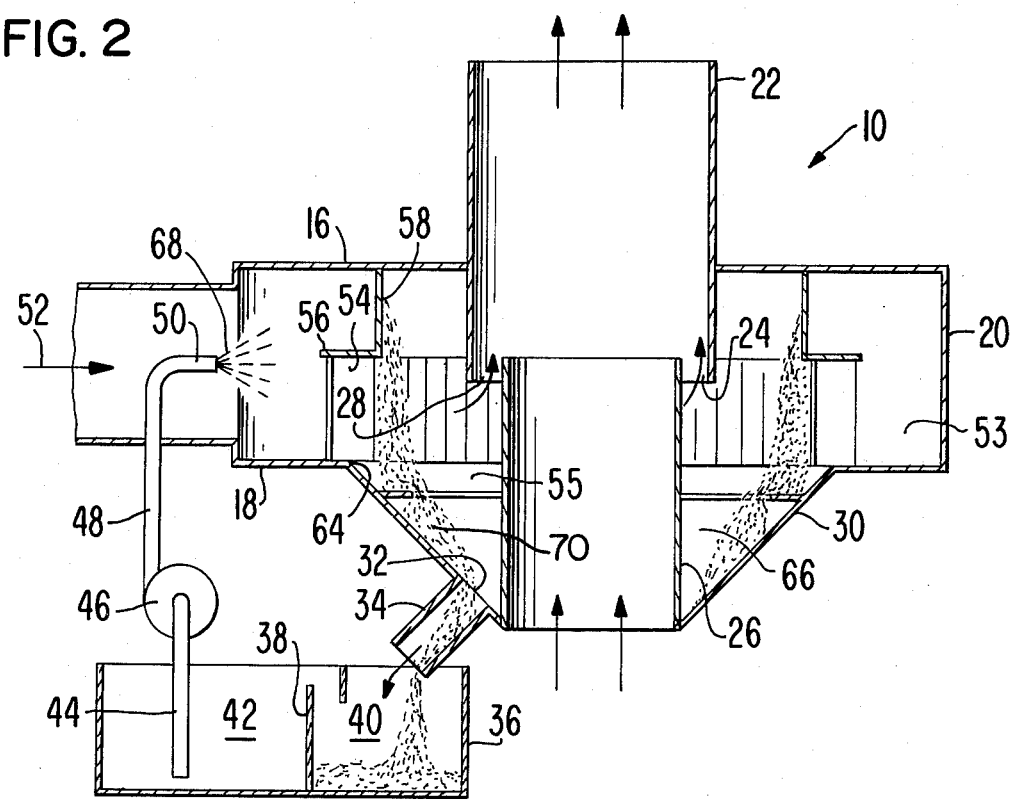
FIG. 2 is a vertical section through the air scrubber of FIG. 1.
Figure 3:
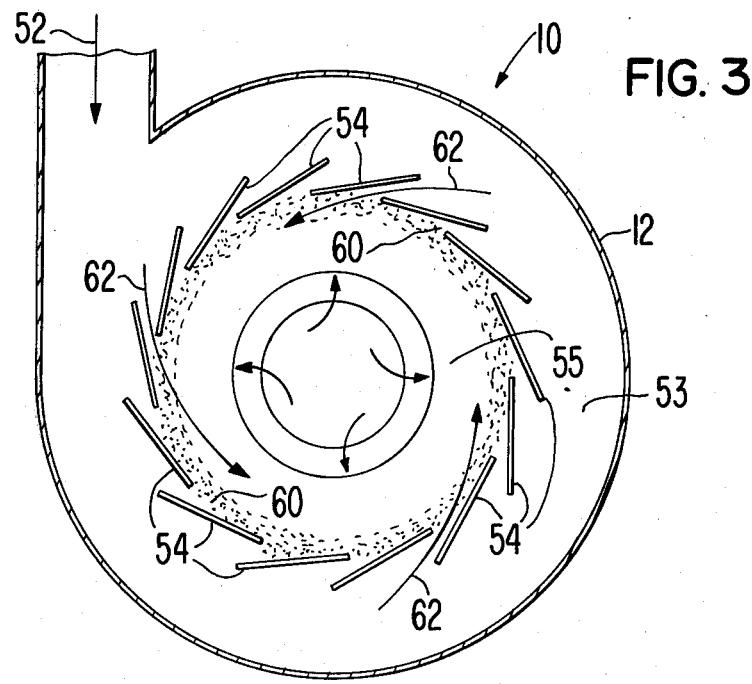
FIG. 3 is a horizontal section through the air scrubber of FIGS. 1 and 2.

The first embodiment of the apparatus of the present invention is broadly denoted by the numeral 10 and is illustrated in FIGS. 1–3. Apparatus 10 includes a circular housing 12 having a tubular extension 14 at the outer periphery thereof and tangential thereto to provide an air inlet into the housing. The construction of the housing includes a top annular wall 16, a bottom annular wall 18, and a generally circular outer sidewall 20 spanning the distance between top and bottom walls 16 and 18.

A tubular stack 22 extends through the central part of upper wall 16 and is generally concentric thereto. Stack 22 is secured to top wall 16 and has a lower, open end 24 surrounding the upper open end of a tube 26 concentric with stack 22. Tube 26 has a diameter less than that of stack 22 to present an annular air passage or inlet 28 externally of air tube 26 to permit cool air to rise into and through stack 22.

Tube 26 is secured at its lower end to the lower extremity of a conical member 30 whose upper, circular margin is rigidly secured to the inner periphery of bottom wall 18 as shown in FIG. 2. Member 30 is open at the bottom thereof and allows air to pass into tube 26 from beneath apparatus 10.

Member 30 has a hole 32 near its lower extremity, and a short pipe 34 communicates with hole 32 and extends outwardly and downwardly therefrom. The lower open end of pipe 34 communicates with the upper, open end of a settling tank 36 having a weir 38 dividing the tank into two sections 40 and 42.

A pipe 44 extends downwardly and into section 42 of tank 36. The upper end of pipe 44 is connected to a fluid pump 46 whose outlet is connected to a pipe 48 having an upper, horizontal part 50 in extension 14 to direct water from tank 36 in a direction downstream of the airflow into extension 14 as indicated by arrow 52.

A plurality of spaced, angled, stationary vanes 54 of generally rectangular shape are secured to bottom wall 18 of housing 12 and extend upwardly therefrom to an annular ring 56 (FIGS. 1 and 2) spaced below top wall 16. An annular partition 58 extends between ring 56 and top wall 16. Thus, a gas circulating in housing 12 through a circular outer region (FIG. 2) around vanes 54 must pass through the spaces therebetween to reach the central space 55 (FIG. 3) surrounded by the vanes.

As shown in FIGS. 1 and 3, each vane is at an acute angle with respect to the next adjacent vane and the spaces between the vanes present fluid passages 60 placing circular outer region 53 in fluid communication with central space 55. A gas entering housing 12 by way of extension 14 is caused to circulate in the housing along a path in region 53 due to the circular shape of the housing. The gas flows also through the various fluid passages 60 in directions indicated by arrows 62 (FIG. 3) and into central space 55 to create a vortex action therein. This is due to the fact that fluid passages 60 extend longitudinally of the circular path of travel of gas around the vanes.

An important aspect of the vanes is the way in which they project inwardly beyond the inner periphery 64 (FIG. 2) of bottom wall 18. The reason for this projection is to allow liquid in central space 55 to more readily flow toward outer portions of fluid passages 60 and to be maintained therein by centrifugal force exerted on the liquid because it is subjected to the vortex action of the gas after the latter enters central space 55. The liquid extends completely across each fluid passage 60 and those portions of the liquid across fluid passages 60 form a penetrable liquid curtain through which the gas must pass as it travels from circular region 53 to central space 55. Thus, there will be intimate contact between the gas and the liquid and this intimate contact can be used to provide for a specific interaction between the gas and the liquid. For purposes of illustration, this interaction is the scrubbing or cleaning of the gas by the liquid when the apparatus of FIGS. 1-3 is used.

In the operation of apparatus 10, assuming a flow of hot, dirty air or gas into housing 12, pump 46 is actuated to pump a liquid, such as water, from section 42 of tank 36 so that a water spray 68 is directed into housing 12 and into the gas flow. The air mixes with the water and flows in the circular path surrounding vanes 54. Eventually, the air will flow through passages 60 between adjacent vanes 54 since annular partition 58 prevents flow in any other direction.

As the air enters and passes through fluid passages 60 in the directions of arrows 62 (FIG. 3), a vortex is created within central space 55 which causes the water that would normally accumulate in space 66 (FIG. 2) to rise due to centrifugal force to create a water curtain 70 (FIG. 2). This curtain of water enters and is maintained across fluid passages 60. If the air is circulating at a relatively high rate, water will enter fluid passages 60 to a greater depth to thereby cause the air entering fluid passages 60 to flow through a greater distance through the water to increase the scrubbing action of the water on the air. This greater thickness may not be necessary or desirable in some cases, but the present invention provides for the availability of this feature.

In the scrubbing action, dirt and other foreign particles are removed from the air and remain in the water. The air continues on and then enters annular passage 28 for transit upwardly through stack 22. The air, after passing through the wall of water, will become moist. The rising air in stack 22 will cause a flow of cool air into the bottom of tube 26 and the cool air will rise through the tube and mix with the hot, moist air passing into stack 22 through annular passage 28. When the two air masses mix, moisture from the hot, moist air will condense on the inner surfaces of stack 22 and will fall by gravity into central space 55.

Water can continually leave space 66 through pipe 34 for gravitation into section 40 of tank 36. Foreign matter, such as dirt particles and the like, will be carried into the tank in this manner and will be kept separate from the water in section 42 by weir 38. Apparatus 10, therefore, provides a scrubber for air which can operate continuously or intermittently as desired, and can effectively clean the air as well as to dry and cool the same before it exits from stack 22.

Figure 4:
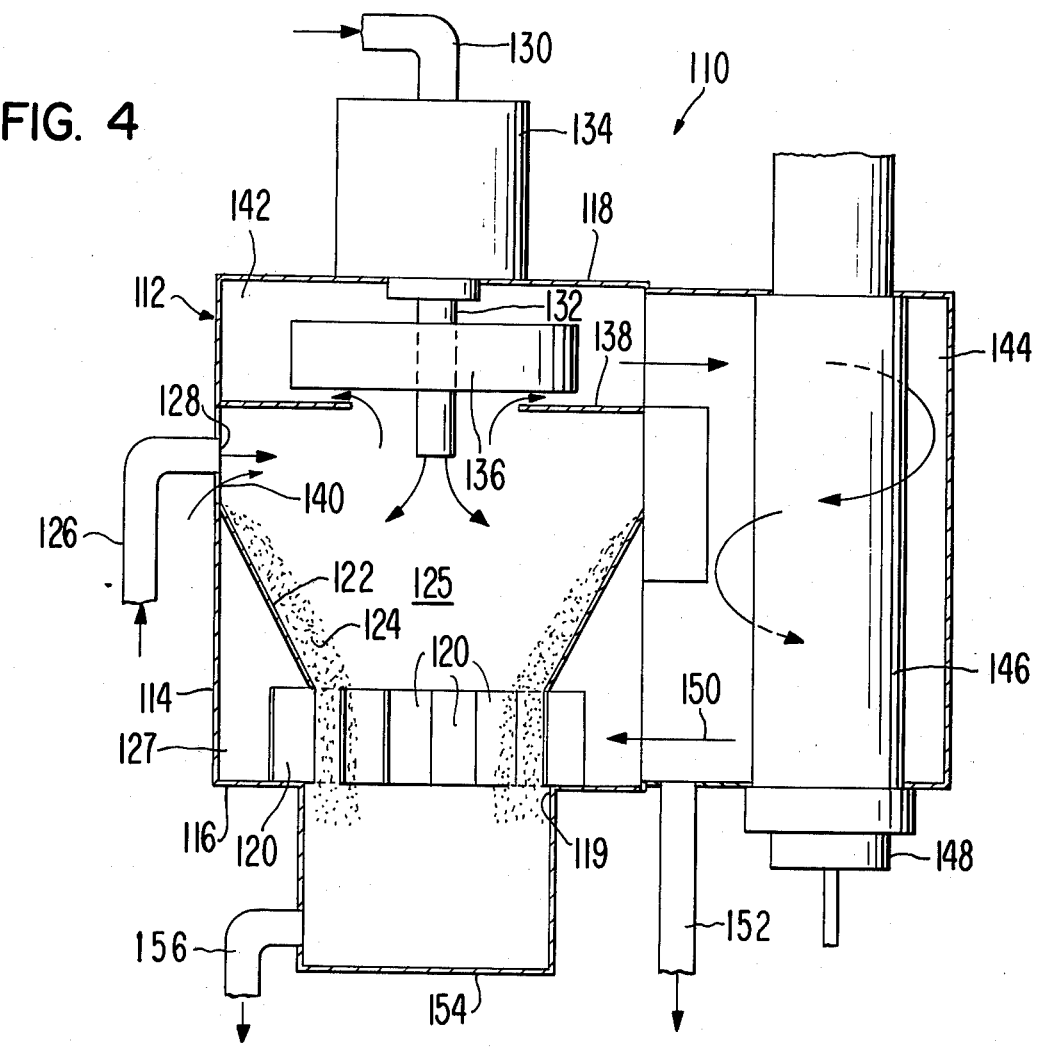
FIG. 4 is a vertical section of another embodiment of the invention as used as a steam or hot water generator.

Another embodiment of the apparatus of the invention is denoted by the numeral 110 and is adapted for use as a steam or hot water generator. Apparatus 110 includes a housing 112 having a generally continuous sidewall 114, a bottom wall 116 and a top wall 118. Bottom wall 116 has an opening 119 therein and also has a plurality of vanes 120 supported and secured thereon in the same pattern as vanes 54 of apparatus 10. Thus, vanes 120 are arranged at acute angles with respect thereto in the same manner as vanes 54 of FIG. 3. As shown in FIG. 4, vanes 120 project a slight distance into opening 119. This is for the same purpose as that described above with respective vanes 54, namely, to allow water to readily move by centrifugal force into the spaces between the vanes to thereby present a liquid curtain for intimate contact between air and water when air flows through the curtain.

An imperforate conical member 122 extends upwardly from the upper margins of vanes 120 and presents a surface along which circulating water, denoted by the numeral 124, can rise and be supported. This circulation of water is due to a vortex action of air or a gas flowing in central space 125 by rotation of a fan blade hereinafter described.

A pipe 126 communicates with the interior of housing 112 through an opening 128 above member 122. Cold water can also enter through a pipe 130 communicating with the tubular drive shaft 132 of a motor 134 carried on top wall 118. A fan blade 136 is mounted on drive shaft 132 above outlet in an annular partition 138 for presenting a blower which pulls air into first side inlet 140 surrounding opening 128, then into a first region 142 adjacent to fan blade 136, then into a second region 144 of housing 112 in surrounding relationship to a heat exchanger 146 having a burner 148, whereby the air in the flow is heated.

The air then passes into a second side inlet of the housing in the direction of arrow 150 toward and through the passages between vanes 120 and into and through the water curtain in the passages between the vanes. In this way, the water is heated by the heated air and the air continues to rise to circulate, first through region 142, then region 144, then back through the vanes and so on. The water curtain is formed when enough water enters housing 112 through one or both pipes 126 and 130 to cause the water to form a continuous wall near the inner ends of vanes 120 by the vortex action of air in central space 120. This vortex action is created by the air continuously passing into central space 125 through the spaces between the vanes from the circular region 127 surrounding the vanes.

A pipe 152 extends downwardly from bottom wall 116 and communicates with the interior of housing 112. A container 154 is secured to and extends downwardly from bottom wall 116 below opening 119 thereof. A pipe 156 communicates with container 154 and is adapted to remove hot water therefrom.

In operation, motor 134 is actuated to cause blade 136 to rotate to cause air to flow into the housing 112 through opening 140, then into first region 142, then into second region 144 in heat exchange relationship to heat exchanger 146 and then through vanes 120, finally returning upwardly in vortex fashion to region 142 for recirculation. When this occurs, water is directed into housing 112 through one or both pipes 126 and 130. The water then is caused by centrifugal force due to the vortex action to flow along the region near the inner ends of vanes 120 and to enter and extend across the spaces between the vanes to form a penetrable water curtain through which the air must pass.

Figure 5:
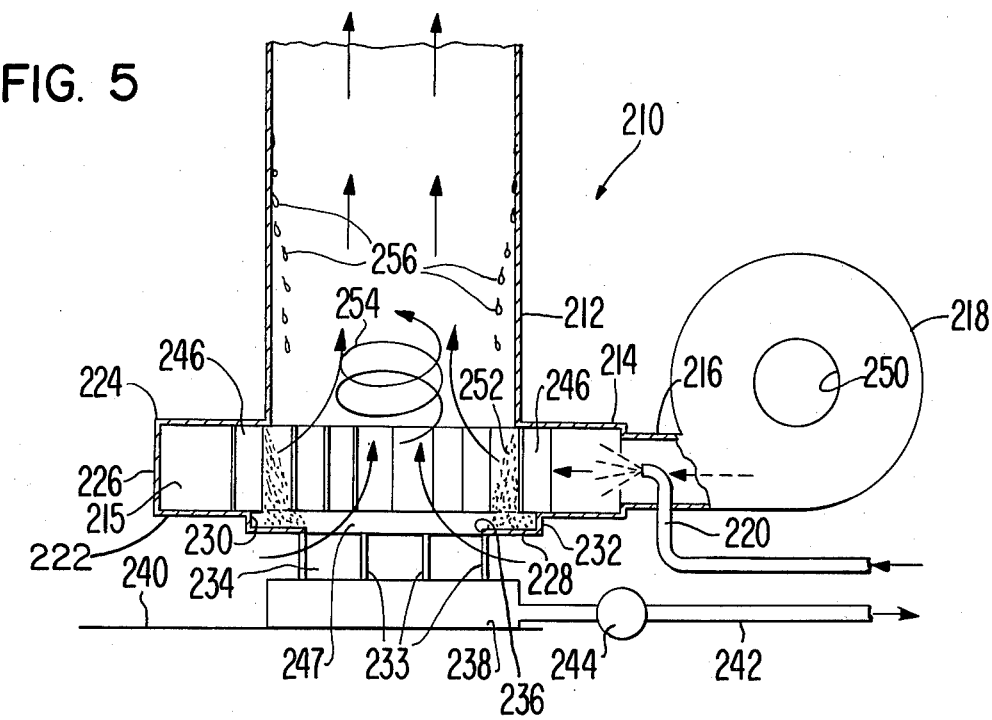
FIG. 5 is a view similar to FIGS. 2 and 4 but showing the invention as used as a cooling tower or exhaust scrubber.

As air flows past heat exchanger 146, the air is heated and the air is then directed through the passages between vanes 120 and through the aforesaid water curtain. The heat from the air is transferred by conduction to the water, and the water can be heated sufficiently to create both hot water and steam. The steam can be removed from housing 112 by way of pipe 152. Hot water falls into container 154 and can be removed therefrom through pipe 156. A third embodiment of the apparatus of this invention used, for instance, as a cooling tower or exhaust scrubber, is broadly denoted by the numeral 210 and is illustrated in FIG. 5. Apparatus 210 includes a tubular upright body 212 extending upwardly from the fluid outlet of a circular housing 214 provided with a tangential air inlet extension 216 for creating a circular flow of air through housing 214 through a circular region 215. This flow is caused by a blower 218 coupled to extension 216. A pipe 220 carried by extension 216 is used to direct water or other liquid in a spray into the airflow.

Housing 214 has a bottom wall 222, a top wall 224 and a generally continuous sidewall 226 bridging the distance between walls 222 and 224. An annular ring 228 is spaced below the inner periphery 230 of bottom wall 222 and is connected thereto by a spacer ring 232. A number of spaced legs 233 extend upwardly from the open top of a pan 238 and the spaces between legs 233 present air passages 234 so that cold air can rise and enter the bottom open end of body 212 for mixing with hot, moist air flowing therein. Pan 238 rests on a support surface 240 and has a pipe 242 provided with a valve or pump 244 thereon permitting water to be removed from the pan as desired or needed.

A plurality of spaced, angled vanes 246 are supported on bottom wall 222 and extend between bottom and top walls 222 and 224 of housing 214. The vanes are arranged in substantially the same pattern as that shown with respect to vanes 154 of FIG. 3. Vanes 246 extend slightly inwardly from the inner periphery 230 of bottom wall 222 so that water can more readily penetrate the spaces between the vanes for the same purposes as described above with respect to vanes 54 and 120 of apparatus 10 and apparatus 110, respectively. This purpose is to create a penetrable water curtain so that air penetrating the water curtain will intimately contact the water and cause an interaction between the air and water.

In operation, apparatus 210, when used as a cooling tower or exhaust scrubber, permits air to enter air inlet 250 of blower 218 and the blower forces the air tangentially into housing 214, creating a circular flow through circular region 215 and a flow through the passages between vanes 246 into central space 247. Simultaneously, hot or cold liquid, such as water, is caused to enter housing 214 by way of pipe 220 for mixing with the air forced into the housing by blower 218. Eventually, sufficient water will pass between the vanes and into central space 247 to create a circulating wall of water due to the vortex action of the air therein. This vortex action is created by the arrangement of the vanes, namely, the spaced, angled positions of the vanes of the type shown in FIG. 3 with respect to vanes 54 of appratus 10.

The wall of water will define a penetrable water curtain denoted by the numeral 252 which extends into the spaces between vanes 246 and remains there due to centrifugal force. This water curtain must be penetrated by the air before the air can rise in body 212.

Cold air is also drawn into the lower end of body 212 and rises with the air from blower 218, the cold air entering passages between legs 233. If the air from blower 218 is hot and moist, the cold air will mix with it to cause condensation of the moisture therefrom. The condensed moisture in the form of droplets 256 will adhere to the inner surface of body 212 and gravitate therefrom into water curtain 252. Water collected in pan 238 can be removed therefrom by way of pipe 242.

Figure 6:
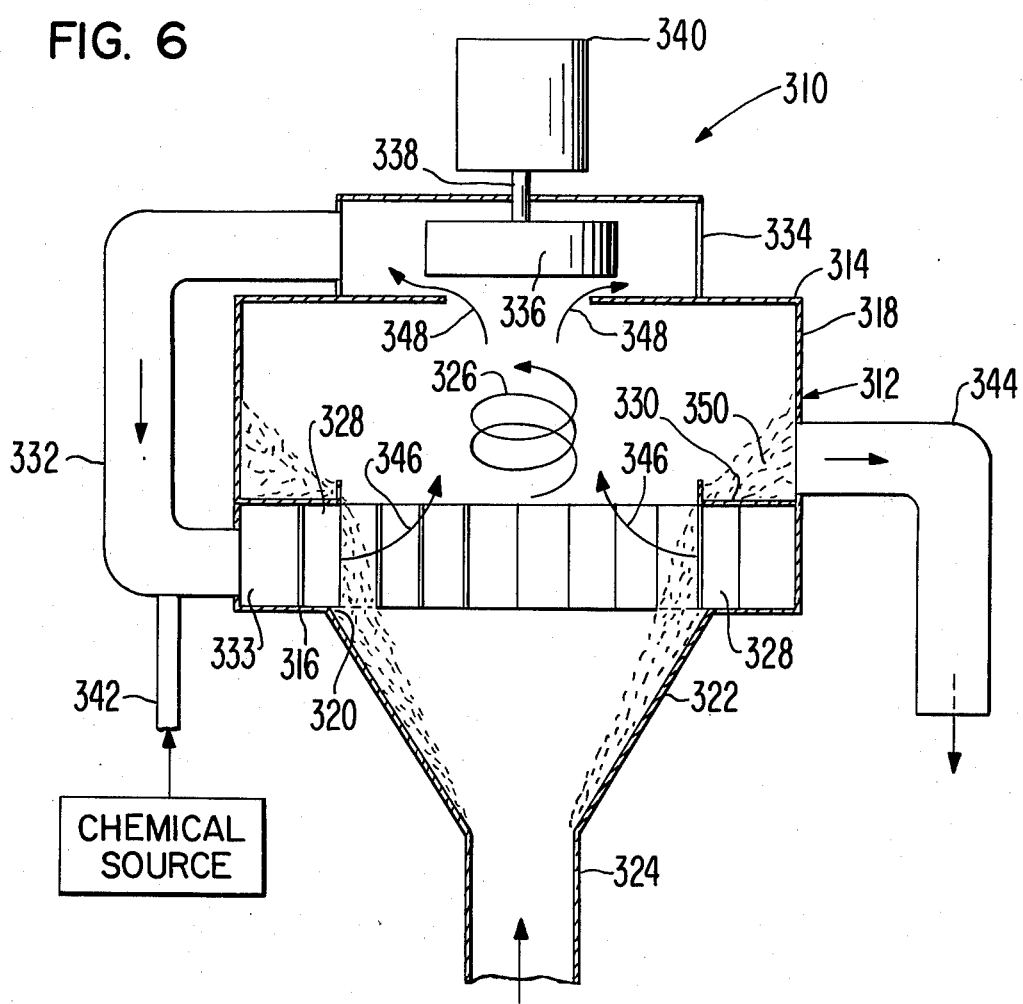
FIG. 6 is a view similar to FIG. 5 but showing the invention being used as a chemical reactor or chlorinator.

A further embodiment of the apparatus of this invention used, for instance, as a chemical reactor is broadly denoted by the numeral 310 and is illustrated in FIG. 6. Apparatus 310 includes a housing 312 having an annular top wall 314 having a fluid outlet opening, an annular bottom wall 316, and a generally continuous sidewall 318 spanning the distance between and secured to the outer peripheral margins of walls 314 and 316. Bottom wall 316 has inner periphery 320 connected to the upper continuous margin of a conical member 322 extending downwardly from housing 312 and terminating at the upper end of an open pipe 324, whereby liquid can be drawn upwardly through the pipe and into member 322 by a vortex action due to airflow in a manner to be described. The vortex action is denoted by the spiral 326 in FIG. 6.

A plurality of fixed vanes 328 are secured to an extend upwardly from bottom wall 316 and project slightly inwardly from the inner periphery thereof. Vanes 328 are provided for the same purpose as vanes 54, 120 and 246 of apparatus 10, apparatus 110 and apparatus 210, respectively. This purpose is, of course, to permit water to enter the spaces between the vanes and to present a penetrable water curtain through which a gas flows to provide a certain interaction between the liquid and the gas. An annular ring 330 substantially identical to bottom wall 316 is disposed on the upper margins of vanes 328 to assure that a gas entering a side inlet of housing 312 by way of a conduit 332 will flow into a circular region 333 and then into and through flow passages between vanes 328 and the water curtain across the same.

Conduit 332 has an upper or gas inlet end communicating tangentially with a circular housing 334 having a fan blade 336 coupled to the drive shaft 338 of a motor 340 carried by housing 334 in a suitable manner. A tube 342 is in communication with conduit 332 to permit the addition of a chemical or chemicals in the form of a liquid or gas such as chlorine or the like. Thus, if chlorine is used as a chemical, apparatus 310 can be considered a chlorinator. A pipe 344 communicating with the interior of housing 312 above ring 330 is used to carry off the liquid treated with the chemicals entering conduit 332 by way of tube 342.

In operation, fan blade 336 is caused to rotate when motor 340 is energized. Air is then caused to circulate through housing 312 and conduit 332 in the direction of arrows 346 and 348. This occurs at the same time that a liquid, such as water, enters pipe 324 and, due to the vortex action of the air flowing through vanes 328, rises along the inner surface of member 322 to form a penetrable water curtain across the fluid passages between vanes 328. Simultaneously, a chemical is added through tube 342 to the air flowing in conduit 332. The chemicals in the airflow must pass through the water curtain and into intimate contact with the water. The chemicals are then mixed with the water and eventually, the curtain flows overs and onto annular ring 330 to form the mass 350 of liquid containing the chemicals. This mass can be drawn off by way of pipe 344 with a pump or by gravitation. The air continues to circulate so long as motor 340 is energized and the water curtain is maintained due to the vortex action created by the airflow through housing 312. As long as chemicals are added to the airflow, there will be a mixture of the chemicals and the liquid to thereby present a chemical reactor, depending upon the type of chemicals which are added.

Figure 7:
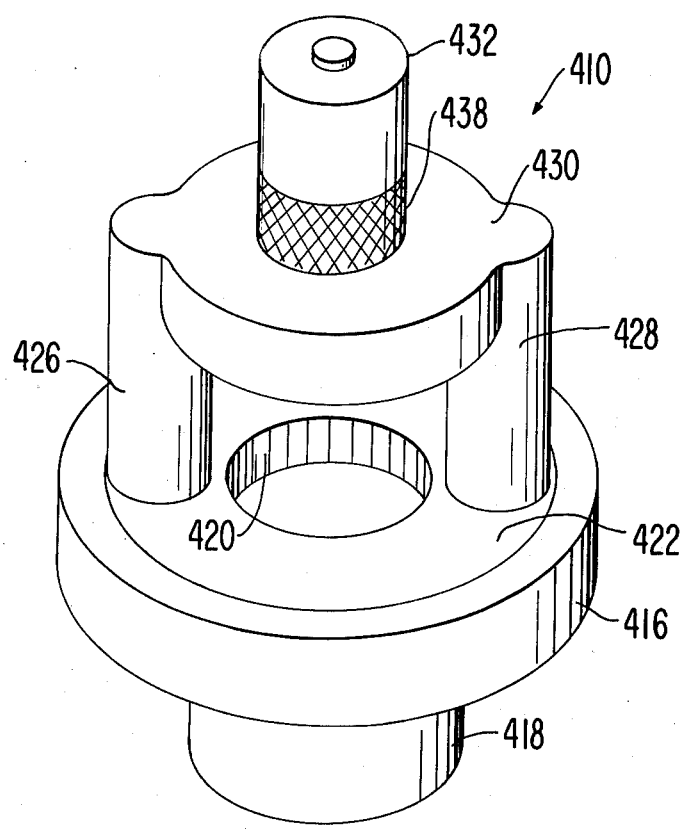
FIG. 7 is a perspective view of another embodiment of the invention as used as an aerator.
Figure 8:
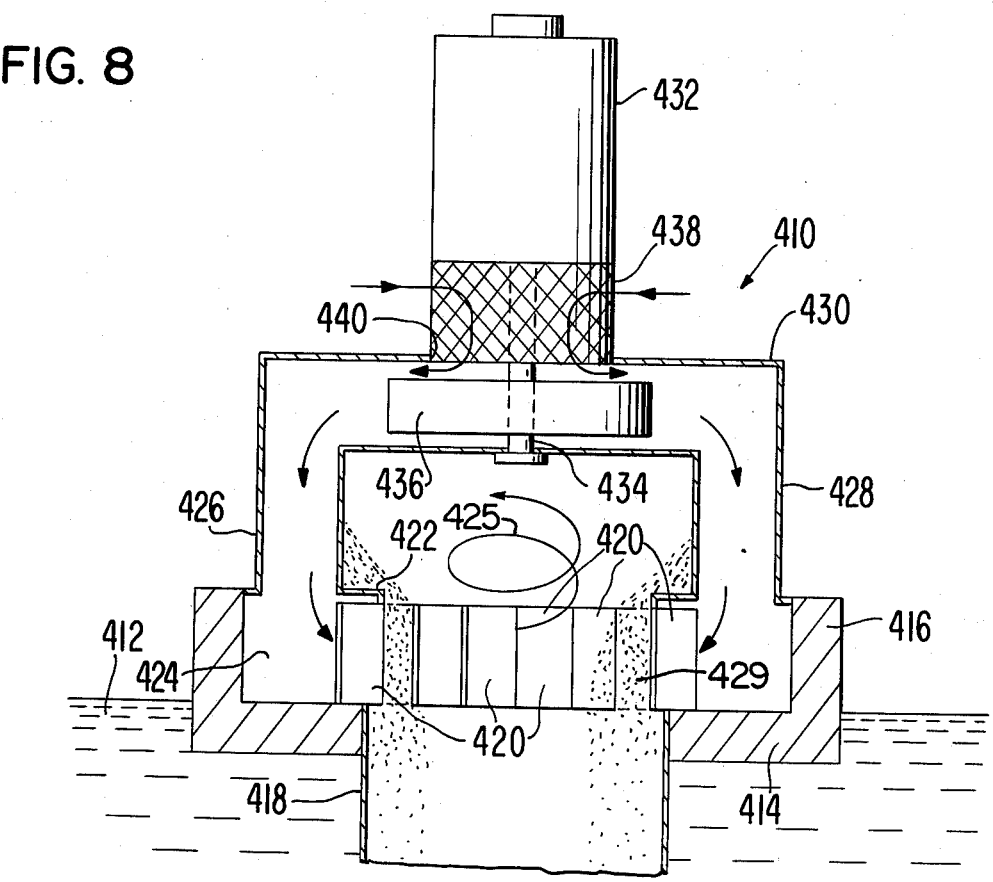
FIG. 8 is a vertical section through the embodiment of the invention of FIG. 7.

Still another emodiment of the apparatus of this invention is denoted by the numeral 410 and is illustrated in FIGS. 7 and 8. Apparatus 410 is to be used for aerating water or other liquid in a pool 412 and includes a flotation member 414 adapted to rest on the upper level of the water. Member 414 has an annular sidewall 416 and a pipe 418 extending downwardly and into the water pool 412 so that water can rise into the flotation member. A plurality of spaced, angled vanes 420 are carried by and are secured to member 414 and project inwardly from the upper circular marginal edge of pipe 418. The vanes terminate at an annular top wall 422 surrounded by sidewall 416 and having a fluid opening. A pair of conduits 426 and 428 extend upwardly from top wall 422 and communicate with a circular space 424 through respective inlets. Conduits 426 and 428 are coupled to a circular housing 430 supporting a motor 432 having a drive shaft 434 on which a fan blade 436 is mounted, the fan blade being within the housing 430. A grill work 438 surrounds drive shaft 434 and extends upwardly from an opening 440 in the top of housing 430 so that air can enter the housing when fan blade 436 is rotated.

In operation, as air flows through conduits 426 and 428 under the influence of fan blade 436, the air enters circular space 424 and flows along the same. Eventually, the air will flow into and through the spaces between vanes 420 since such spaces extend longitudinally of circular space 424. This flow of air through the spaces between vanes 420 creates a vortex action denoted by spiral arrow 425 in central space 427 (FIG. 8), causing water in pipe 418 to rise and follow the vortex pattern due to centrifugal force. This eventually causes a water curtain 429 to be formed near the inner ends of the vanes and the water from the water curtain extends across the spaces between the vanes. The air must flow through this water curtain and, as it does, it aerates the water which then falls back into pool 412. This aeration of the water continues so long as motor 432 is actuated.

I claim:

1. Apparatus for creating an interaction between a gas and a liquid comprising: a housing having a gas inlet, a gas outlet and means defining a circular path of travel for a gas between the inlet and outlet, said housing further having a pair of vertically spaced members, the lower member having an annular portion defining a generally continuous inner periphery, there being structure coupled to and extending downwardly from said lower member, and a plurality of spaced vanes mounted in fixed positions within the housing between said members, each of said vanes projecting inwardly of said inner periphery of the lower member, said vanes being at acute angles relative to each other and arranged in a circular pattern in surrounding relationship to a central, liquid-receiving space in the housing, the central space communicating with the outlet, the spaces between the vanes defining fluid passages in flow communication with said central space and in fluid communication with said path and extending substantially along said path, there being means coupled with the housing for introducing a liquid thereinto, whereby a gas flowing through said fluid passages and into said central space will create a vortex action in the latter to cause a liquid therein to move upwardly with respect to said structure past said inner periphery and to enter said fluid passages to thereby form a penetrable liquid curtain extending across the fluid passages for contact with the gas as it flows from said path into said central space.

2. Apparatus as set forth in claim 1, wherein said vanes are disposed in generally vertical planes, and including a vertical, open ended stack communicating with said central space, at least a part of the lower end of the stack defining said outlet.

3. Apparatus as set forth in claim 2, wherein said housing has an opening in the bottom thereof aligned with said stack to permit air to flow upwardly into and through said stack, said lower member having structure surrounding the opening to at least partially support a liquid.

4. Apparatus as set forth in claim 3, further including an open end tube extending upwardly from the bottom opening and partially into said stack in spaced relationship thereto.

5. Apparatus as set forth in claim 1, wherein said housing has a bottom provided with an annular, outer part defining the lower member, said structure defining a conical inner part extending downwardly from the outer part, the vanes projecting inwardly of the junction of said parts.

6. Apparatus as set forth in claim 5, wherein said inner part has a central bottom opening and a tube extending upwardly from said opening and terminating within said central space, there being an open end stack secured to and extending upwardly from said housing in surrounding, spaced relationship to and in fluid communication with the upper end of said tube and said central space, the space between the lower end of the stack and the upper end of the tube defining said outlet.

7. Apparatus as set forth in claim 6, wherein said introducing means being operable for directing liquid along said path.

8. Apparatus as set forth in claim 1, wherein said introducing means being operable for directing a liquid into said central space.

9. Apparatus as set forth in claim 1, further including means coupled with the housing for defining a second gas flow path communicating with the first-mentioned path, there being a heat exchanger in said second path, the second path being located to permit the gas to move past and into heat exchange relationship with said heat exchanger, means coupled to said housing for creating a fluid flow along said paths, said means adjacent to one of said paths to remove a fluid therefrom.

10. Apparatus as set forth in claim 1, wherein said apparatus further includes means coupled with said inlet for creating a fluid flow along said path, said means being operable for directing a liquid into said path.

11. Apparatus as set forth in claim 1, wherein the lower member has an annular ring spaced below said annular portion, and a spacer ring connecting the outer periphery of the annular ring to the inner periphery of the annular portion.

12. Apparatus as set forth in claim 1, further including means within the housing for creating a flow of fluid along said path, and means coupled with said creating means for adding a chemical to said fluid flow.

13. Apparatus as set forth in claim 1, wherein said housing has means thereon for permitting it to float on water, there being a tube communicating with said central space and extending downwardly from said permitting means and into a body of water when the housing floats thereon, and including means coupled with the housing for creating a fluid flow along said path.

14. A method of creating an interaction between a gas and a liquid comprising: providing a circular fluid flow path in surrounding relationship to an open central space; providing a generally continuous inner peripheral opening between the path and the central space; forming a number of spaced fluid passages near the inner periphery of the path with the fluid passages projecting inwardly of said inner peripheral opening and communicating with said path, said central space and a region below said opening; moving a gas along said path, said fluid passages extending at acute angles to the direction of travel of the gas to thereby permit portions of the gas to enter said central space through said fluid passages and to create and maintain a vortex action therewithin adjacent to the inner ends of said fluid passages; forming and maintaining a penetrable liquid curtain extending upwardly from said region and across the inner ends of said fluid passages in response to said vortex action; directing the gas through said liquid curtain and into said central space; and allowing the gas to move out of said central space.

15. The method as set forth in claim 14, further including the step of cooling the gas and condensing the moisture therefrom as it leaves the central space.

16. The method as set forth in claim 14, further including the step of adding a liquid to the fluid flow as it moves along said path.

17. The method as set forth in claim 16, further including the step of collecting the liquid at a collection station after it has passed into the central space.

18. The method as set forth in claim 17, further including the step of pumping at least part of the collected liquid from said collection station to said path.

19. The method as set forth in claim 14, further including the steps of providing a second path coupled with the first-mentioned path to form a loop, heating the gas as it flows along said second path so that heat energy can be transferred to the liquid to create hot water and steam, and including the step of removing hot water and steam from the housing.

20. The method as set forth in claim 14, wherein said directing step includes allowing the gas to move vertically out of the central space, and including the step of condensing the moisture in the gas as it moves upwardly, and spraying a liquid into the gas as it flows along said path.

21. The method as set forth in claim 14, further including the step of adding a chemical to the gas as it flows along said path.

22. The method as set forth in claim 14, further including the step of providing a floatation member defining the central space, floating said member on a body of water, said moving step including lifting portions of the water out of the body of water for flow in a vortex pattern to form said liquid curtain so that the gas aerates the lifted water.

* * * * *